United States Patent
Shetty et al.

(10) Patent No.: US 12,481,584 B2
(45) Date of Patent: Nov. 25, 2025

(54) DUAL CACHE ARCHITECTURE AND LOGICAL-TO-PHYSICAL MAPPING FOR A ZONED RANDOM WRITE AREA FEATURE ON ZONE NAMESPACE MEMORY DEVICES

(71) Applicant: Micron Technology, Inc., Boise, ID (US)

(72) Inventors: Pranam Shetty, Udupi (IN); Manoj Selvam, Bangalore (IN); Adarsha P, Bangalore (IN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/676,664

(22) Filed: May 29, 2024

(65) Prior Publication Data

US 2024/0403217 A1 Dec. 5, 2024

Related U.S. Application Data

(60) Provisional application No. 63/505,479, filed on Jun. 1, 2023.

(51) Int. Cl.
G06F 12/02 (2006.01)

(52) U.S. Cl.
CPC .. *G06F 12/0246* (2013.01); *G06F 2212/7201* (2013.01); *G06F 2212/7203* (2013.01)

(58) Field of Classification Search
CPC ......... G06F 12/0246; G06F 2212/7201; G06F 2212/7203
See application file for complete search history.

(56) References Cited

U.S. PATENT DOCUMENTS

2024/0094903 A1* 3/2024 Kavirayani ........... G06F 3/0631

OTHER PUBLICATIONS

"NVM-Express-Base-Specification-2.0b-2021.12.18-Ratified", Base Specification, Revision 2.0b Jan. 6, 2022, pp. 1-455.
NVM Express Registered, "NVM Command Set Specification", Revision 1.0b Jan. 6, 2022, pp. 1-105.
NVM Express Registered, "Zoned Namespace Command Set Specification", Revision 1.1, May 18, 2021, pp. 1-46.
NVM, "NVMe—TP 4076 Zoned Random Write Area Aug. 23, 2021—Ratified (1)", NVM Express, Inc, 2021, 23 Pages.

* cited by examiner

*Primary Examiner* — Chie Yew
(74) *Attorney, Agent, or Firm* — NICHOLSON DE VOS WEBSTER & ELLIOTT LLP

(57) ABSTRACT

A method includes allocating random write resources to a first portion of a zone having a range of LBAs and a cache storing data of the first portion of the zone. A write command is received including an LBA. The LBA is mapped to a PBA of the cache using a first L2P table. Each of one or more LBAs in the range of LBAs of the first portion of the zone is mapped to a corresponding PBA of the cache using entries of the first L2P table. A range of sequential LBAs of a second portion of the zone is mapped to a physical block of the zone. Each LBA of the range of sequential LBAs is accessed using an offset corresponding to a position of each LBA in the range of sequential LBAs of the second portion of the zone. The write command is executed at the PBA.

20 Claims, 11 Drawing Sheets

DUAL CACHE ARCHITECTURE AND LOGICAL-TO-PHYSICAL MAPPING FOR A ZONED RANDOM WRITE AREA FEATURE ON ZONE NAMESPACE MEMORY DEVICES

CROSS-REFERENCE TO RELATED APPLICATION

The present application claims the benefit of U.S. Provisional Patent Application No. 63/505,479, filed on Jun. 1, 2023, which is hereby incorporated by reference.

TECHNICAL FIELD

The present disclosure generally relates to zone namespace (ZNS) memory devices, and more specifically, relates to implementing a zoned random write area (ZRWA) feature on ZNS memory devices using a dual architecture and a logical-to-physical mapping table.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
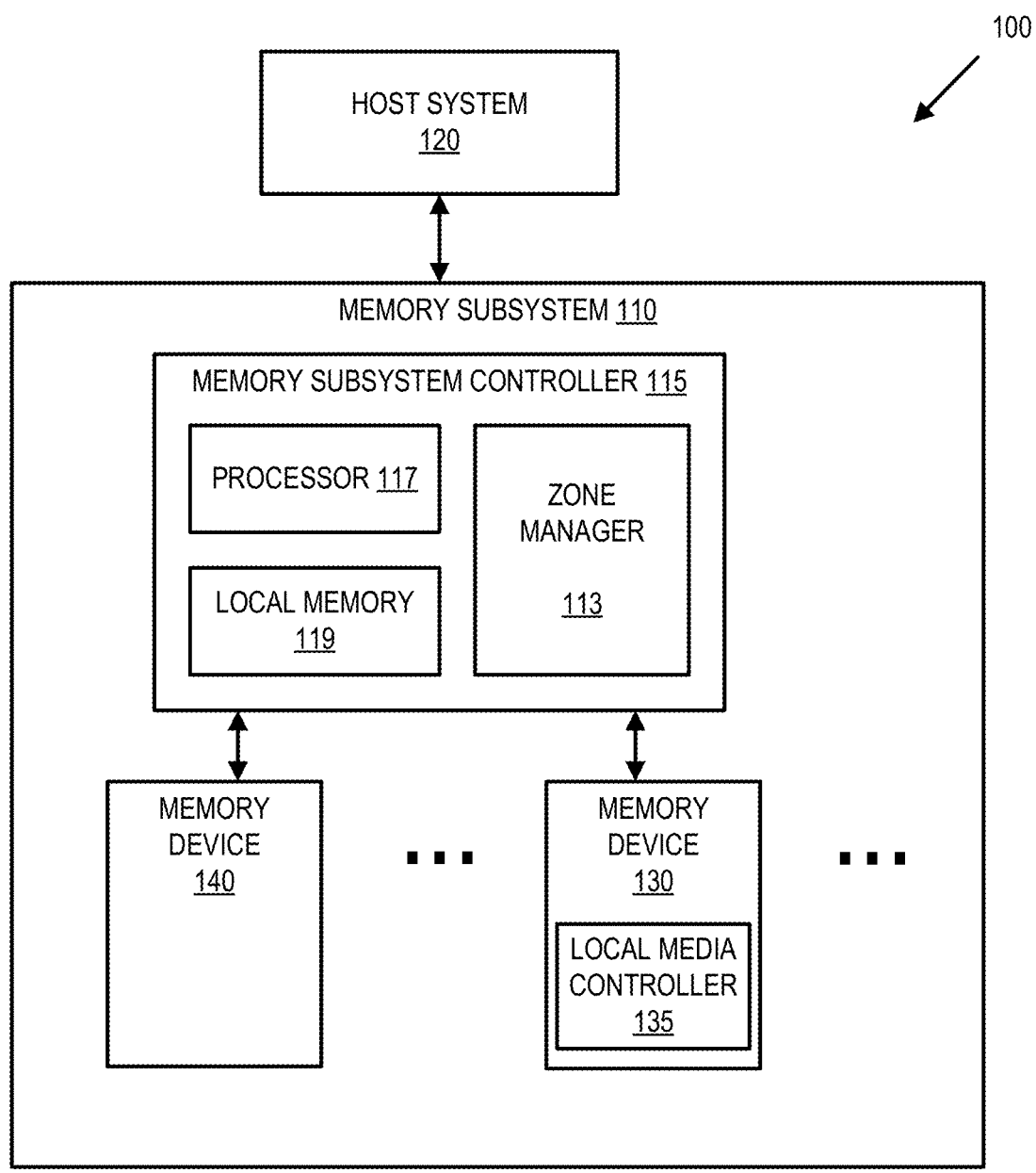
FIG. 1 illustrates an example computing system that includes a memory subsystem in accordance with some embodiments of the present disclosure.

Aspects of the present disclosure are directed to implementing ZRWA on a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dies. One example of non-volatile memory devices is a negative-and (NAND) memory device. Other examples of non-volatile memory devices are described below in conjunction with FIG. 1. The dies in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, an SLC can store one bit of information and has two logic states.

Memory devices using zone namespaces (ZNS) and similar protocols divide memory into zones that each include a plurality of memory blocks or other addressable portions of memory. Such memory devices write data for zones sequentially (i.e., prohibiting random writes to memory blocks within a zone). Conventional methods use zone level mapping to map a physical block to logical blocks allocated to the zone. For example, ZNS can use a zone logical block address that consists of a zone identifier and an offset within the zone.

A new feature of ZNS, zone random write area (ZRWA), allows random writes in certain designated regions of a zone. As described in NVMe Technical Proposal 4076, data may be written to LBAs within the ZRWA in any order. Logical blocks and metadata are then flushed from the ZRWA to the zone including the ZRWA. The random nature of the write commands results in writing to noncontiguous logical blocks and the possibility of overwriting data referenced by logical blocks. Once data is written from the ZRWA to the zone, logical blocks of the zone cannot be overwritten without, e.g., invalidating the existing zone and writing the updated data to a new zone.

Aspects of the present disclosure describe a ZRWA implementation in memory devices using a dual cache architecture and a logical-to-physical (L2P) mapping table. Implementation details are provided to address current implementation deficiencies. For example, a secondary cache isolates random write support from a conventional cache supporting sequential writes. Additionally, a ZRWA-specific L2P mapping table (ZLT) maps LBAs of random writes to physical block addresses (PBAs) to track LBAs at a more granular level, e.g., than in conventional ZNS. By tracking LBAs at a granular level, the ZLT maintains a record of the most recent LBAs, including a most recent version of LBAs that have been overwritten. The implementation details improve the support of both random writes and sequential writes using ZRWA regions of a zone.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory device 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a zone manager 113 that can implement a dual cache architecture and manage LBAs of random writes using a ZRWA-specific L2P table (ZLT). In some embodiments, the controller 115 includes at least a portion of the zone manager 113. For example, the controller 115 can include a processor 117 (processing device) configured to execute instructions stored in local memory 119 for performing the operations described herein. In some embodiments, a zone manager 113 is part of the host system 120, an application, or an operating system.

The zone manager 113 interfaces with a legacy cache (otherwise referred to herein as a "primary cache") that buffers data referenced by LBAs of sequential writes. Responsive to a flush operation (an explicit flush or an implicit flush, as described herein), the zone manager 113 writes data referenced by LBAs buffered in the secondary cache to the primary cache. The zone manager 113 also tracks LBAs received in random writes by maintaining a ZLT. When the zone manager 113 flushes the LBAs (or other logical blocks, which includes any unit/amount of memory) from the secondary cache to the primary cache, the zone manager 113 invalidates the flushed LBAs in the secondary cache. Additionally, when the zone manager flushes LBAs, the zone manager obtains data referenced by the flushed LBAs using the ZLT to flush data referenced by the LBA to the primary cache. Further details with regards to the operations of the zone manager 113 are described below.

Figure 2:
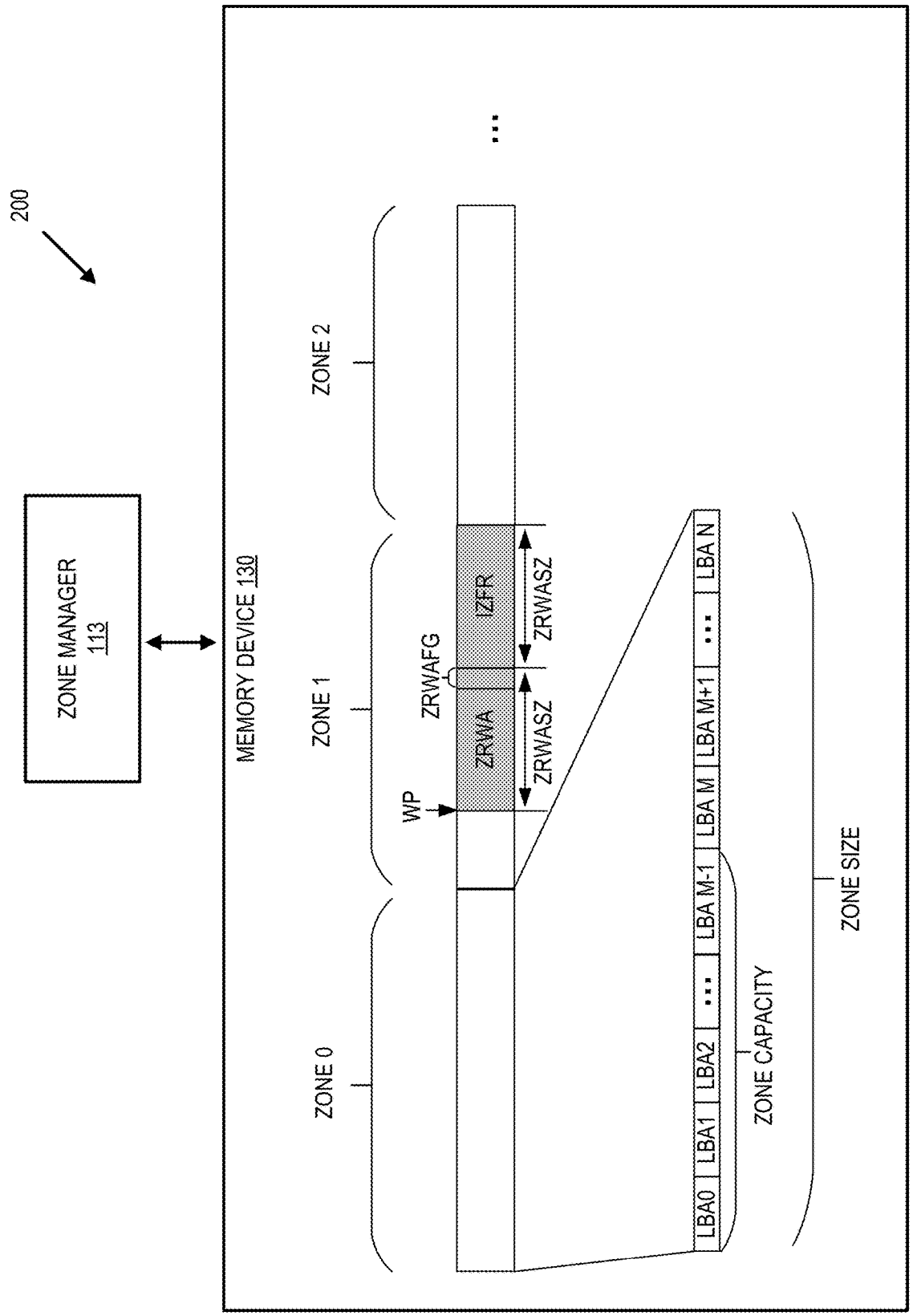
FIG. 2 illustrates an example memory device managed by the zone manager in accordance with some embodiments of the present disclosure.

FIG. 2 illustrates an example memory device managed by the zone manager 113, in accordance with some embodiments of the present disclosure. As shown in example 200, the zone manager 113 partitions LBAs of a zone up to a zone size. The maximum writable space of each zone is identified by a zone capacity. Each zone may be the same size (e.g., include the same number of logical blocks) or different sizes. Conventional zones store logical blocks written sequentially to a zone (e.g., zone 0, zone 2, etc.). Accordingly, to map the logical blocks in zone 0 to a physical block, the zone manager 113 uses a L2P table leveraging zone level mapping to map a range of sequential LBAs (or other units of logical blocks) in zone 0 to a physical block. By leveraging the sequential nature of the LBAs within a zone, the zone manager 113 does not need to map every LBA in zone 0 to a corresponding PBA. Instead, the zone manager 113 can leverage a mapping to a zone and LBA-sized offsets within the zone, e.g., to execute a read operation directed to a particular LBA.

As described herein, some zones may include ZRWA regions that allow for random writes. By definition, a random write is a write to nonsequential LBAs. Because the received write command can include data to be written to noncontiguous LBAs, the zone manager 113 tracks the written LBAs to prevent overwriting PBAs with previously assigned LBAs and/or writing to invalid PBAs. As described herein, the zone manager 113 maps LBAs of a ZRWA to PBAs using a more granular level of mapping, as compared to the mapping performed by the zone manager 113 when leveraging zone level mapping.

In some embodiments, the zone manager 113 creates a ZRWA of a zone by allocating ZRWA resources to the zone. As shown, the ZRWA is a portion of zone 1. Zone 1 includes a ZRWA of a size referred to herein as a zone random write area size (ZRWASZ). The ZRWASZ is a total size of logical blocks of the ZRWA and is a multiple of the ZRWA flush granularity (ZRWAFG). The ZRWAFG is a minimum number of logical blocks flushed or otherwise moved to additional memory (e.g., from the secondary cache to the primary cache). The write pointer (WP) corresponds to an LBA offset within the zone and indicates the lowest numbered LBA within the ZRWA region that is available for writing data.

In the illustrated example, adjacent to the ZRWA region, is an implicit flush region (IZFR). The illustrated IZFR also has a size of ZRWASZ. Accordingly, the range of LBAs spanning the IZFR and ZRWA is a number of LBAs equal to 2×ZRWASZ. For example, given a ZRWASZ of 16 LBAs, and WP=LBA0, the range of LBAs of the ZRWA would span from LBA0:15, and the range of LBAs of IZFR would span from LBA16:31. Therefore, the range of LBAs spanning the IZFR and ZRWA is LBA0:31. As described herein, when a LBA of a write command crosses from the ZRWA into the IZFR, an implicit flush operation is triggered. Similarly, when a LBA of a write command exceeds the IZFR, an implicit flush operation is triggered.

During a flush operation (e.g., an implicit flush operation or an explicit flush operation), logical blocks are read from a cache and transferred/written to additional memory such as another cache. As described herein, the additional cache may be a primary/legacy cache defined for conventional ZNS operations where the write commands are sequential. The cache storing ZRWA logical blocks is described herein as the secondary cache, where the legacy cache storing non-ZRWA logical blocks is described herein as the primary cache.

Figure 3:
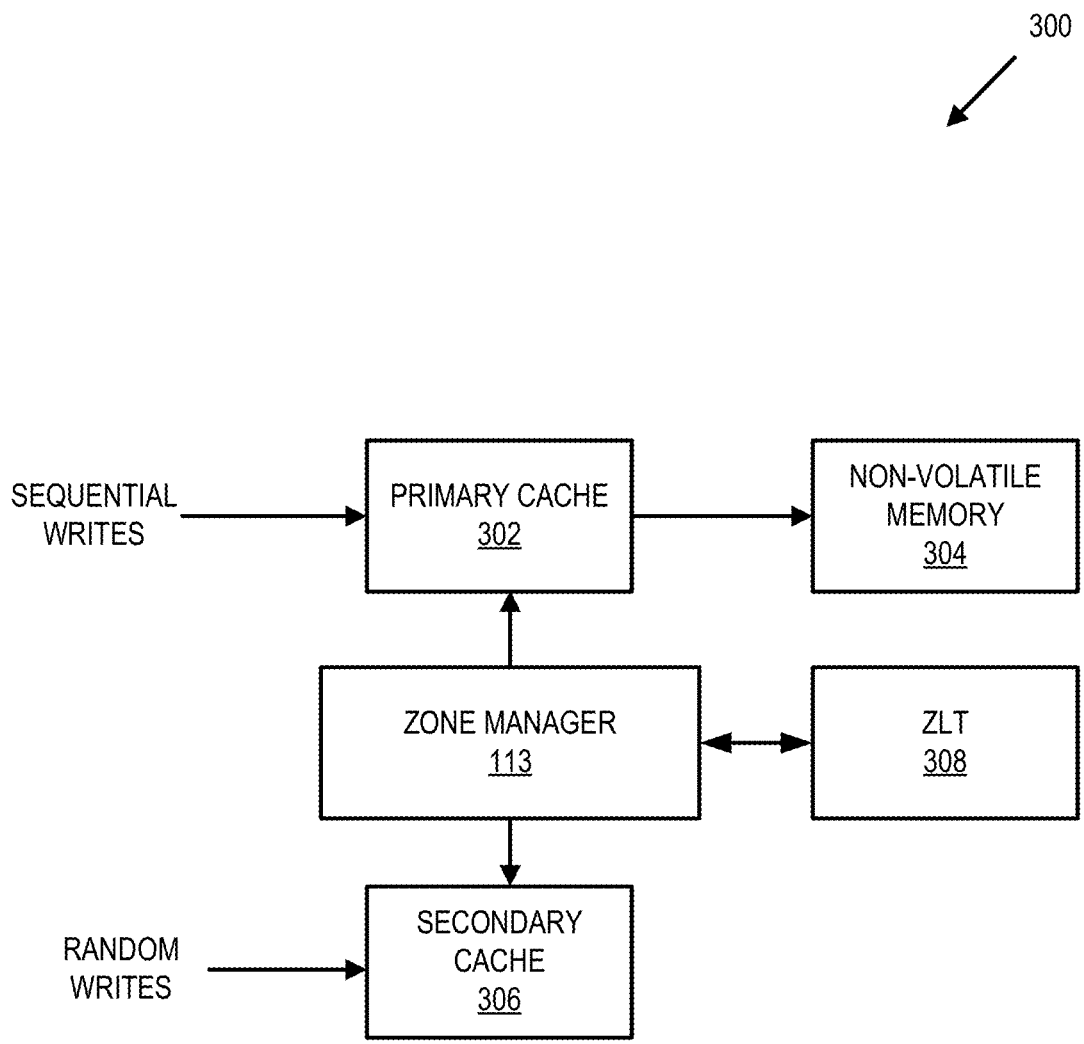
FIG. 3 illustrates an exemplary dual cache architecture in accordance with some embodiments of the present disclosure.

FIG. 3 illustrates an exemplary dual cache architecture 300, in accordance with some embodiments of the present disclosure. As shown, the primary cache 302 is configured to handle sequential write commands. In some embodiments, the zone manager 113 determines whether the write command is a random write or a sequential write. For example, the zone manager 113 can evaluate whether the LBAs of the write command are contiguous or noncontiguous in relation to a previously received write command and/or in relation to the LBAs of the write command.

The primary cache 302 buffers write data while programming the non-volatile memory 304. For example, during two-pass programming, the first pass includes coarse data programming and the second pass includes fine data programming. To prevent data loss between the first and second passes, data is stored in the primary cache 302 until the second pass of fine data programming is complete, when the logical blocks of the primary cache 302 are written to non-volatile memory 304.

The secondary cache 306 is configured to handle random write commands (e.g., ZRWA write commands). The secondary cache, storing the data from logical blocks of a ZRWA write command and in some implementations the ZRWA logical-to-physical table (ZLT) as described with reference to FIG. 8, may be any memory including, e.g., SLCs, MLCs, and TLCs. In some embodiments, the zone manager 113 allocates resources for the secondary cache when the random resources are allocated for ZRWA, as described above. In some embodiments, TLC memory is preferable over SLC memory and MLC memory to support higher overall ZRWA capacity/density and reduction in overall memory cost. MLC memory may be preferable over TLC memory and SLC memory to support a higher rate of LBA overwrites (or invalidations) while maintaining more capacity/density than SLC. SLC memory may be preferable over TLC memory and MLC memory to support higher random read/write performance.

The zone manager 113 manages the secondary cache 306, flushing the data/logical blocks of the secondary cache 306 to the primary cache 302 responsive to an implicit flush and/or explicit flush as described with reference to FIG. 9, which illustrates example operations associated with receiving an explicit flush operation, and FIG. 8, which illustrates example operations associated with determining an implicit flush operation.

The zone manager 113 also maintains ZLT 308. As described herein, a mapping table such as ZLT 308 tracks a subset of LBAs that are included in ZRWA write commands. Other LBAs that are not included in the ZRWA are managed using zone-level mapping (e.g., not in ZLT 308 but instead using a less granular L2P mapping than the LBA mapping in ZLT 308). For example, as described herein, the zone manager 113 maps sequential LBAs to zones such that the zone manager 113 does not need to map every LBA in the zone to a corresponding PBA. Instead, the zone manager 113 can access an LBA within a zone using the zone mapping and calculates an offset value corresponding to the position of the LBA within the zone by determining a sequential position of the LBA relative to the first LBA of the zone. For simplicity of explanation, the examples below may reference LBA to PBA mapping using ZLT 308 and LBA to zone mapping using a different L2P table or similar data structure that maps an LBA via a physical address for a zone and calculates an offset value within the zone that corresponds to the LBA.

The zone manager 113 allocates the ZLT for a particular zone when the ZRWA resources are allocated for that zone. In some embodiments, the zone manager 113 leverages an entry of a zone (such as an internal zone mapping table). For example, the zone manager 113 stores an index of a ZLT in the zone mapping table against the entry for that zone to indicate an allocated ZLT for a particular zone. The zone manager 113 deallocates the ZLT when the zone transitions to a state (such as the "full state") and the ZRWA resources of the zone are released, as described under in the ZNS specification. In some embodiments, deallocating the ZLT updates the index of the ZLT in an entry of a zone. For example, deallocating the ZLT can include removing one or more ZLT entries from a zone mapping table (such as the internal zone mapping table previously described) for that zone.

The size of the ZLT depends on a number of factors such as the ZRWASZ, a rate of transfer of data from the secondary cache 306 to the primary cache 302 on an implicit ZRWA flush operation, and a read/write performance. In some implementations, the size of the ZLT is set to 2×ZRWASZ. By maintaining 2×ZRWASZ number of entries for LBAs, the zone manager 113 is able to store a number of entries for a current ZRWA, while also maintaining LBA entries for incoming write LBAs during an implicit flush operation. The maximum number of LBAs in the implicit flush operation is defined according to the ZRWASZ, as described herein.

Figure 4:
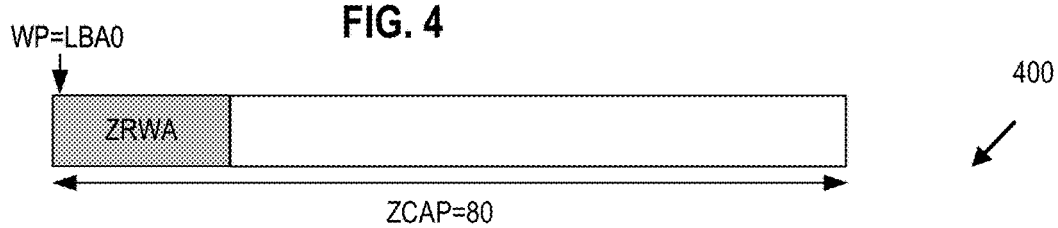
FIG. 4 illustrates an example sequence of write commands within a current ZRWA in accordance with some embodiments of the present disclosure.
Figure 5:
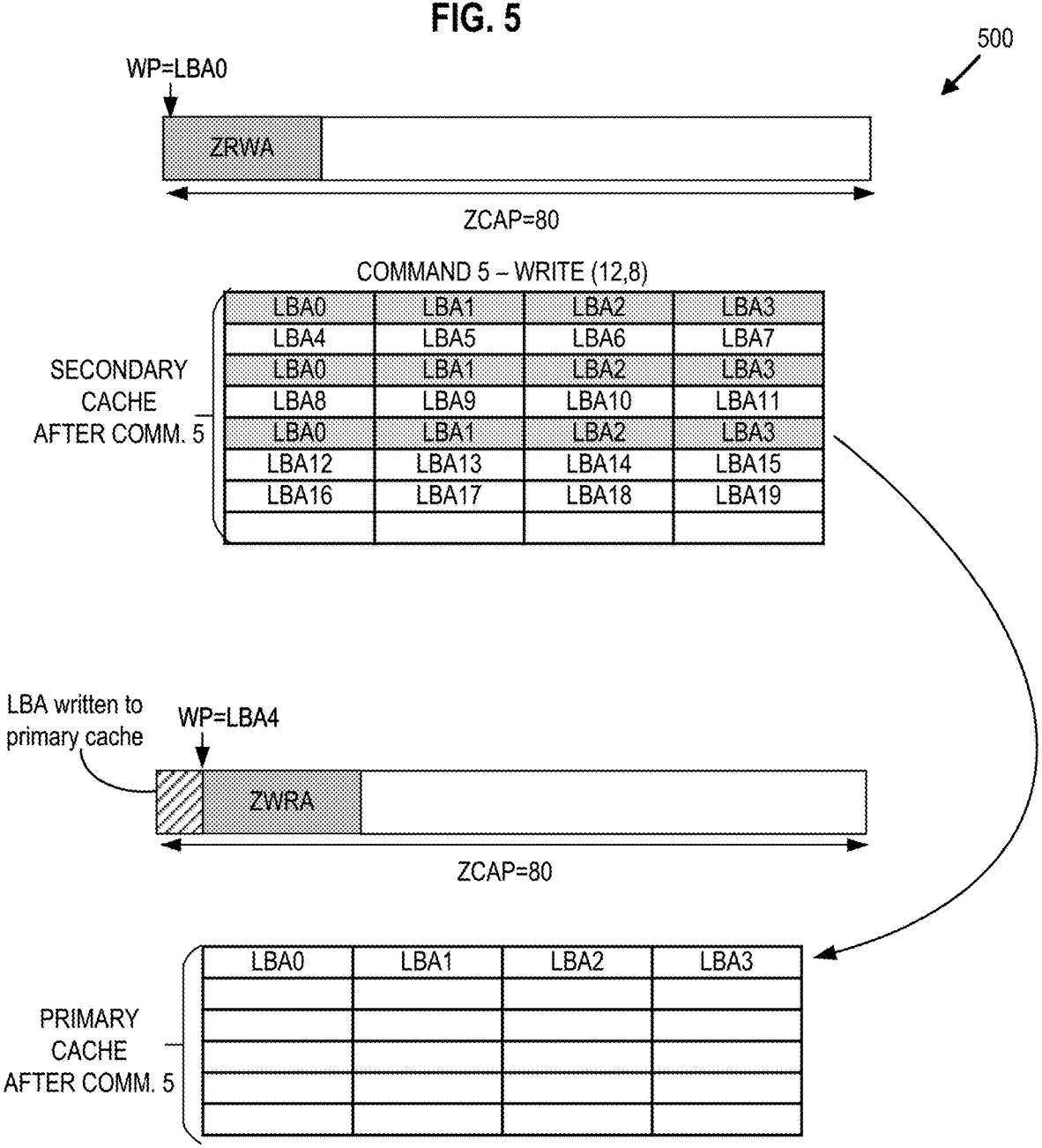
FIG. 5 illustrates an example of managing a write command with an LBA range going beyond the current ZRWA but not exceeding the implicit flush region in accordance with some embodiments of the present disclosure.
Figure 6:
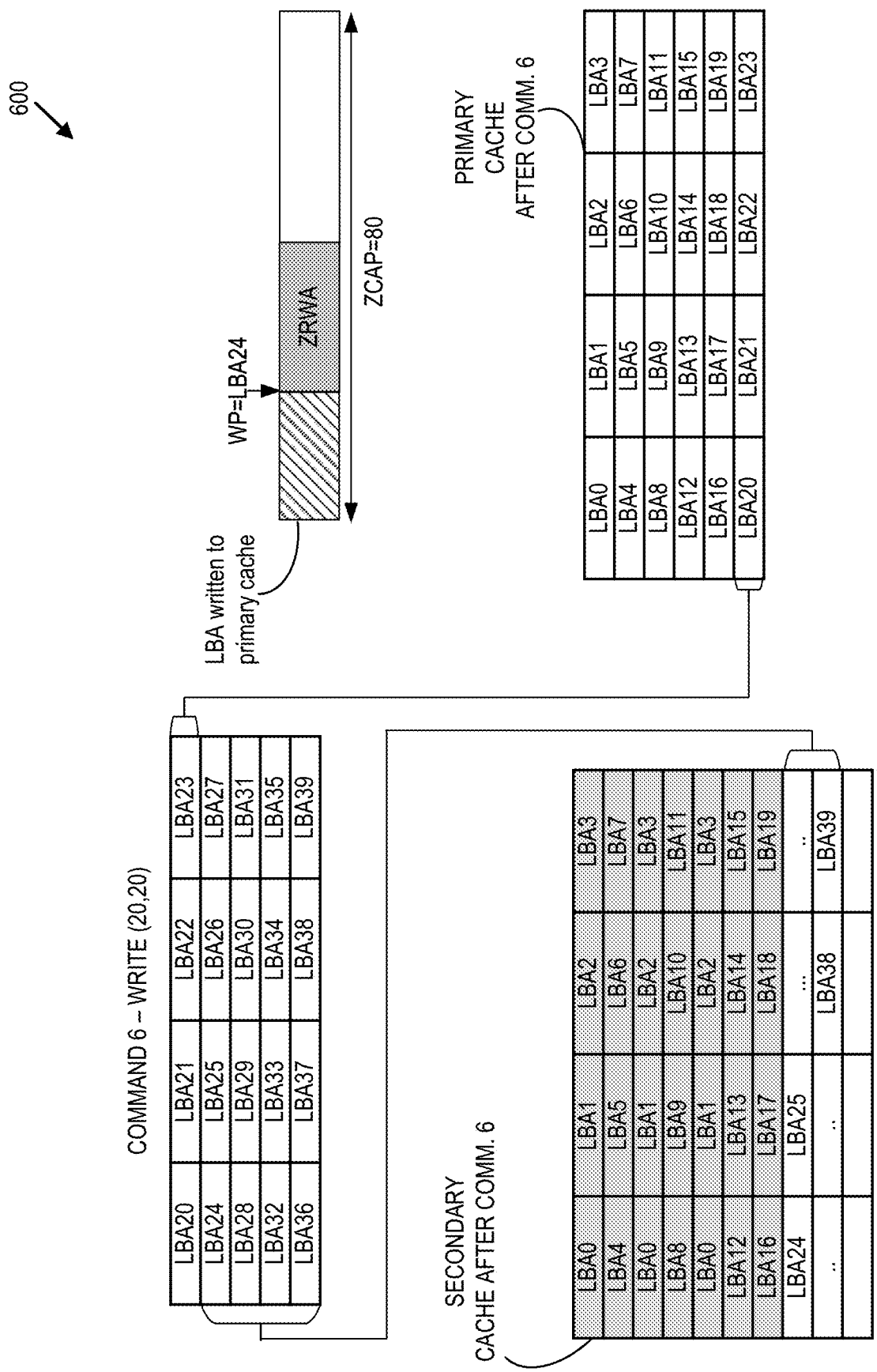
FIG. 6 illustrates an example of a write command LBA range exceeding both the ZRWA and the implicit flush region in accordance with some embodiments of the present disclosure.
Figure 7:
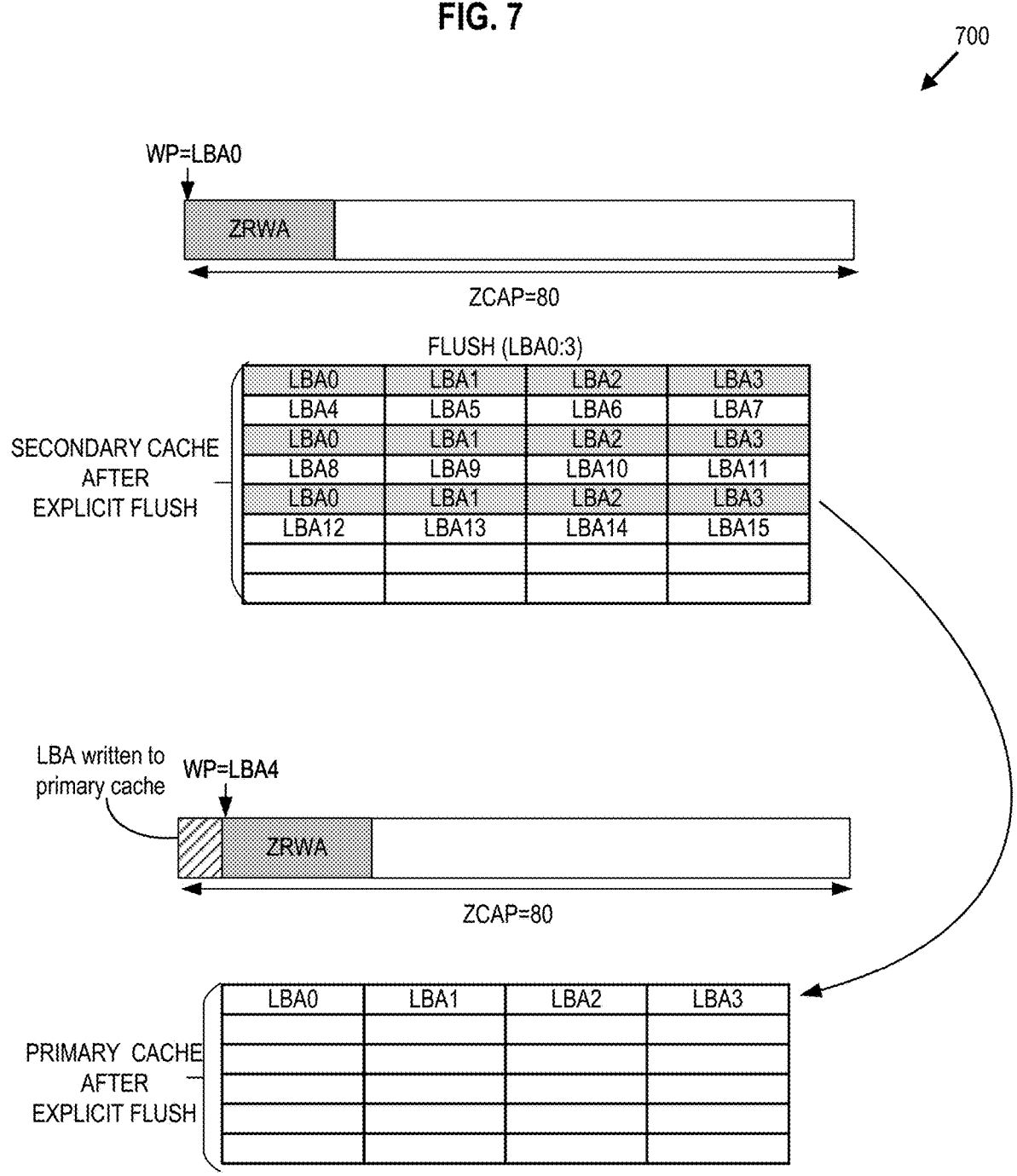
FIG. 7 illustrates an example of implementing an explicit flush in accordance with some embodiments of the present disclosure.

FIGS. 4-7 illustrate examples of a memory subsystem implementing ZRWA using a dual cache architecture in accordance with some embodiments of the present disclosure. Specifically, FIG. 4 illustrates an example sequence of write commands within a current ZRWA. FIG. 5 illustrates managing a write command with an LBA range going beyond the current ZRWA but not exceeding the implicit flush region. FIG. 6 illustrates an example of a write command LBA range exceeding both the ZRWA and the implicit flush region. FIG. 7 illustrates an example of the zone manager 113 implementing an explicit flush. In each of FIGS. 4-7, the illustrated examples assume the zone manager has allocated a zone with ZRWA resources such that each write command is executed as a ZRWA write command. Additionally, the examples set ZRWASZ=16 LBAs and ZRWAFG=4 LBAs.

In example 400 of FIG. 4, a first command is received by the zone manager 113. The command indicates LBAs of the write command using write (starting LBA, number of LBAs) notation. As shown, the first command write(0,8)

writes to LBA0:7 within the ZRWA region, which currently includes LBA0:15. Accordingly, the zone manager 113 stores data referenced by LBA0:7 in the secondary cache. Additionally, the zone manager 113 updates the ZLT for the LBAs written in the secondary cache. For example, the zone manager 113 maps LBA0:7 to PBAs of the ZRWA. The second command write(0,4) writes LBA0:3, which were previously written during the first write command. Accordingly, the zone manager 113 invalidates the previously written LBA0:3 in the secondary cache. Additionally, the zone manager 113 updates the ZLT for the LBAs written in the secondary cache (while the ZLT is not illustrated, the invalidation of the previously written LBAs is indicated using shading in the secondary cache). Updating ZLT entries (e.g., a mapping between an LBA and PBA) can include remapping a new PBA to the LBA or otherwise deleting the previous entry and adding a new entry mapping the LBA to the subsequently written PBA. The third write command write(8,4) writes LBA8:11. The LBAs referenced in the write command are still within the ZRWA region, which currently includes LBA0:15. The zone manager 113 also updates the ZLT by mapping LBA8:11 to physical blocks of the ZRWA. The fourth write command write(0,4) also writes LBA0:3, which were previously written during the first write command and the second write command. Accordingly, the zone manager 113 invalidates the previously written LBA0:3 in the secondary cache (indicated using shading). Additionally, the zone manager 113 updates the ZLT for the LBAs written in the secondary cache. After commands 1-4, the zone manager 113 has written LBAs in the secondary cache and maintained a ZLT table, but the zone manager 113 has not yet flushed LBAs from the secondary cache to the primary cache.

In example 500 of FIG. 5, a fifth command is received by the zone manager 113. As shown, the zone manager 113 receives write(12,8) and stores data referenced by LBA12:19 in the secondary cache. However, LBA16:19 are outside the current ZRWA region including LBA0:LBA15. As described herein, the implicit flush region is a size equal to ZRWASZ, such that the LBAs spanning IZFR currently include LBA16:31. The LBAs referenced by write(12,8) include LBA12:19, which are within the implicit flush region ending at LBA31. Because the LBAs of the write command have crossed from the ZRWA to the IZFR, an implicit flush is triggered. The flushed LBAs are determined using a new WP, which the zone manager 113 determines algorithmically.

In the example 500, the new WP=LBA4, meaning that the zone manager 113 flushes four LBAs and the data written to the LBAs to the primary cache. As shown, the zone manager 113 flushes LBA0:3 to the primary cache, indicated using shading of the secondary cache. While described as flushing LBAs, it should be appreciated that other logical blocks of different units/amounts of memory can be flushed. When the zone manager 113 flushes LBA0:3 to the primary cache, the zone manager 113 invalidates LBA0:3 in the secondary cache indicated using shading in the secondary cache. Because LBA0:3 was previously written to the secondary cache, the zone manager 113 previously mapped LBA0:3 to physical blocks of the ZRWA using any suitable mechanism and stored such mapping in entries in the ZLT. When the zone manager 113 flushes LBA0:3 to the primary cache, the zone manager 113 obtains data referenced by LBA0:3 using the ZLT to flush the data referenced by LBA0:3 to the primary cache. The zone manager 113 then deletes ZLT entries including LBA0:3. By deleting ZLT entries mapping flushed LBAs, the ZLT maps the subset of LBAs of the current ZRWA. If the LBAs in the write command were not previously written to the secondary cache, the zone manager 113 would indicate that the LBAs were unmapped using any suitable mechanism. For example, the zone manager 113 may set an unmapped data bit in the LBA metadata before flushing the LBAs to the primary cache. In one embodiment, the zone manager 113 indicates that the LBA is unwritten as described in the Deallocated or Unwritten Logical Blocks portion of the NVM Command Set Specification.

In addition to flushing LBA0:3, the zone manager 113 stores the data referenced by LBAs of the write command in the secondary cache and updates the ZLT for the written LBAs. As shown, the zone manager 113 stores data referenced by LBA12:19 in the secondary cache. Similarly, the zone manager 113 maps LBA12:19 to physical blocks of the ZRWA in the ZLT.

In example 600 of FIG. 6, a larger number of LBAs are directly written in the primary cache without needing to be written in the secondary cache, as illustrated in example 500 of FIG. 5. As shown in example 600, a sixth command is received by the zone manager. The sixth command write(20,20) writes to LBA20:39. As described above, the new WP location is WP=LBA4. Accordingly, the ZRWA starts at LBA4. Additionally, it is assumed that ZRWASZ=16 LBAs. Therefore, the ZRWA is LBA4:19. The IZFR is another 16 LBA, or spans LBA20:35. However, the LBAs of the write command write to LBA39, exceeding both the ZRWA (e.g., LBA19) and the IZFR (e.g., LBA35).

As a result, an implicit flush is triggered. The flushed LBAs are determined by the updated WP location, which the zone manager 113 determines algorithmically. For example, using the below formula, the new WP location=LBA24. As a result, data written to LBAs between the previous WP location (e.g., LBA4) and the new WP location (e.g., LBA24) are flushed, resulting in the zone manager 113 flushing LBA4:19 from the secondary cache to the primary cache. The zone manager 113 maintained a ZLT entry for LBA4:19 because LBA4:19 was previously written. However, because WP=LBA24, LBA20:23 of the write command is also flushed from a write buffer to the primary cache (e.g., without caching LBA20:23 in the secondary cache and/or updating the ZLT). The zone manager 113 indicates that LBA20:23 is unmapped (e.g., setting an unmapped data bit in the LBA metadata before flushing the LBAs to the primary cache) because the data referenced by LBA20:23 is written directly to the primary cache. As shown, the primary cache includes data written to LBA0:23. The zone manager 113 invalidates the previously written LBAs (e.g., LBA0:19) in the secondary cache and stores data referenced by LBA24:39 in the secondary cache. The zone manager 113 also deletes ZLT entries including LBA0:19, as indicated by shading in the secondary cache. When the zone manager 113 stores data referenced by LBA24:39 in the secondary cache, the zone manager 113 also updates the ZLT, mapping entries of LBA24:39 to physical blocks of the ZRWA.

FIG. 7 illustrates an example of the zone manager 113 implementing an explicit flush. As shown, the host (such as host system 120) sends a flush command to the zone manager 113, indicating the logical blocks to be flushed from the secondary cache to the primary cache. The explicit flush command flush (LBA0:3) indicates the LBAs to be flushed (or in some embodiments, the new WP location), flushing LBA0:3 and data written to LBA0:LBA3. As described herein, because LBA0:LBA3 were previously written, the zone manager 113 created one or more entries in the ZLT mapping LBA0:3 to physical blocks of the ZRWA using any suitable mechanism. Accordingly, when the zone manager 113 flushes LBA0:3 to the primary cache, the zone manager 113 invalidates LBA0:3 in the secondary cache. Using the ZLT, the zone manager 113 obtains data referenced by LBA0:3 to flush the data referenced by LBA0:3 to the primary cache. The zone manager 113 also deletes entries including LBA0:3 in the ZLT. If the LBAs in the write command were not previously written to the secondary cache, the zone manager 113 would indicate that the LBAs were unmapped using any suitable mechanism. For example, the zone manager 113 may set an unmapped data bit in the LBA metadata before flushing the LBAs to the primary cache.

Figure 8:
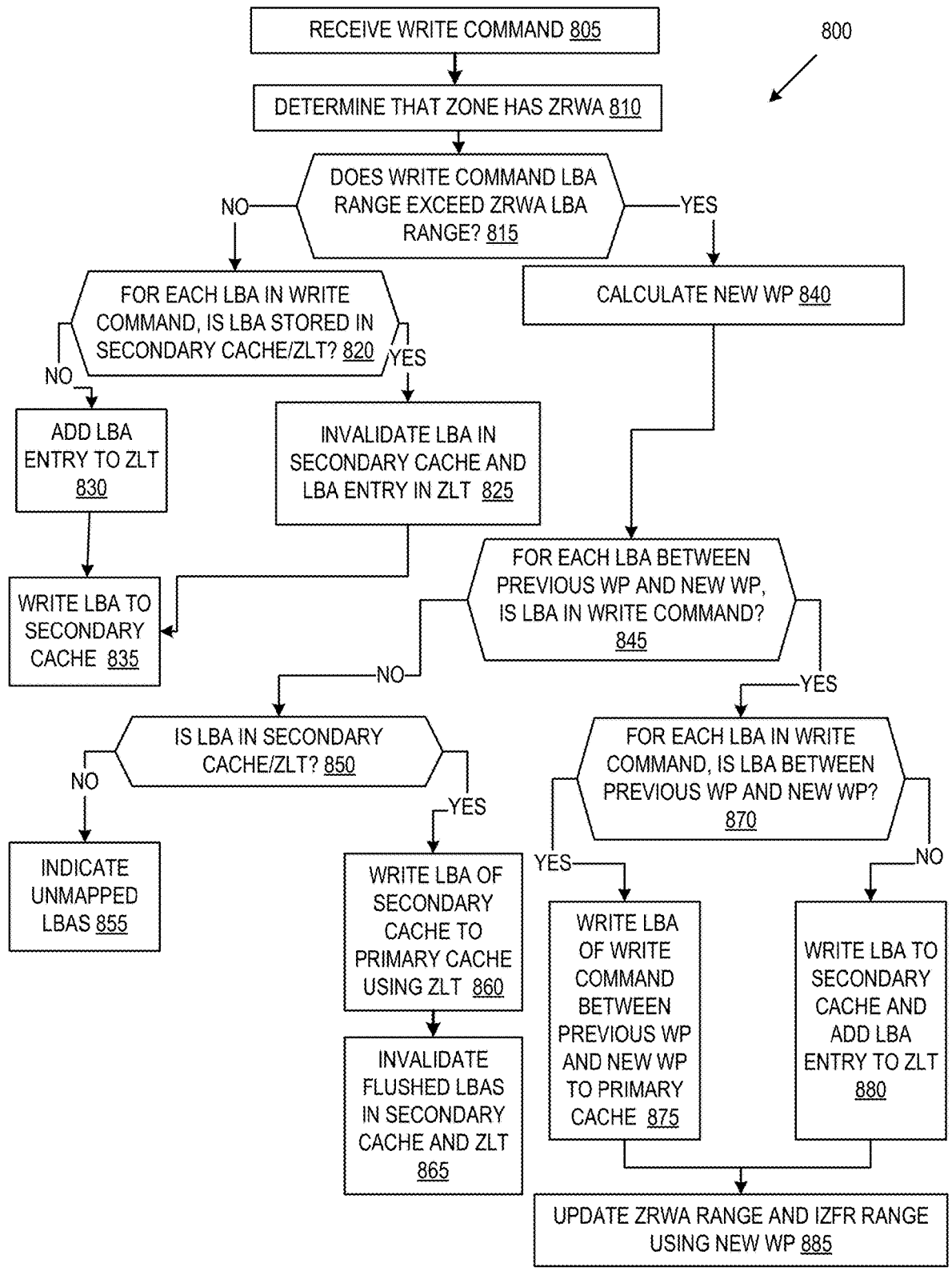
FIG. 8 is a flow diagram of an example method to support random writes in ZRWA in accordance with some embodiments of the present disclosure.

FIG. 8 is a flow diagram of an example method to support random writes in ZRWA in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by a processing device such as the zone manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, the processing device receives a write command. For example, the host system 120 or an internal media management process of the memory subsystem 110 can issue a write command that identifies data to be written to a portion of the memory using one or more LBAs. The one or more LBAs spanning the write command (e.g., LBA0:3) are considered the write command LBA range with a starting LBA (e.g., LBA0) and an ending LBA (e.g., LBA3). For ease of description, the write command received at operation 805 is described as a random write when directed to a random write area of the zone, as described further below. However, it should be appreciated that the write command received at operation 805 may be a sequential write (i.e., directed to the next one or more LBAs in a sequence of LBAs).

At operation 810, the processing device determines that a zone includes a ZRWA. As described herein, one or more zones have ZRWA based on allocated ZRWA resources. For example, a zone supporting a ZRWA may indicate resources allocated for ZRWA via a "ZRWA Support bit" in the Optional Zoned Command Support field, as described in the ZNS specification. For ease of description, the zone written in the present example(s) includes a ZRWA. If the zone manager 113 determines that a zone does not include a ZRWA (e.g., ZRWA resources have not been allocated to the zone, therefore there is no ZRWA associated with that zone), then the zone manager 113 can perform conventional ZNS operations.

At operation 815, the processing device determines whether the write command LBA range exceeds the ZRWA LBA range. For example, the zone manager 113 compares the one or more LBAs of the write command LBA range to one or more LBAs spanning the ZRWA range defined by the ZRWASZ and WP. Specifically, the zone manager 113 determines whether the last LBA of the write command LBA range is less than or equal to the last LBA in the ZRWA LBA range. If the write command LBA range exceeds the ZRWA LBA range (i.e., the last LBA of the write command LBA range is greater than the last LBA in the range of LBAs of the current ZRWA), the flow of operations moves to operation 840. If the write command LBA range does not exceed the ZRWA LBA range (i.e., the last LBA of the write command LBA range is less than or equal to the last LBA in the range of LBAs of the current ZRWA), the flow of operations moves to operation 820.

At operation 820, the processing device determines whether each LBA of the write command has already been written in the secondary cache. For example, the zone manager 113 compares each LBA of the one or more LBAs of the write command to LBAs currently in the secondary cache as represented by the ZLT. If the LBA is in the secondary cache/ZLT (e.g., an LBA is being written to the ZRWA for a second/subsequent time), the flow of operations moves to operation 825. If the LBA has not been previously written to in the secondary cache (e.g., a write command referencing a new LBA is received), the flow of operations moves to operation 830. In other words, a write command can include both an LBA that was previously stored in the secondary cache/ZLT, which leads to performing operation 825, and an LBA that was not previously stored in the secondary cache/ZLT, which leads to also performing 830.

At operation 825, the processing device invalidates each previously written LBA in the secondary cache and each previously stored LBA entry in the ZLT. For example, with reference to the secondary cache, the zone manager 113 invalidates or deletes the data referenced by the LBA in the secondary cache. With reference to the ZLT, the zone manager 113 remaps the LBA to a new PBA or otherwise deletes the previous entry in the ZLT and adds a new entry mapping the LBA to the subsequently written PBA in the ZLT.

At operation 830, the processing device adds an entry to the ZLT. The zone manager 113 uses any suitable mechanism of mapping one or more LBAs to one or more PBAs of the ZRWA and stores such mappings in the ZLT entry.

At operation 835, the processing device writes the data referenced by the LBAs of the write command to the secondary cache as described herein.

At operation 840, the processing device calculates a new WP. For example, the zone manager 113 determines according to the following formula:

$$\text{If, } (\text{Last\_LBA} - \text{IZFR\_Start\_LBA}) \bmod FG > 0$$

$$\text{Then, New\_WP} = WP + \text{ceiling}\left(\frac{\text{Last\_LBA} - \text{IZFR\_Start\_LBA}}{FG}\right) xFG$$

$$\text{Else, New\_WP} = WP + \left(\text{ceiling}\left(\frac{\text{Last\_LBA} - \text{IZFR\_Start\_LBA}}{FG}\right) + 1\right) xFG$$

In the formula above, NEW_WP represents the new write pointer, WP represents the initial write pointer, IZFR_Start_LBA represents the start of IZFR (e.g., WP+ZRWASZ), last_LBA represents the ending LBA in the write operation, and FG represents the ZRWA flush granularity (ZRWAFG).

At operation 845, the processing device determines whether each LBA between the previous WP and the new WP is in the write command. Specifically, the zone manager 113 evaluates the flushed LBAs (e.g., the LBAs between the previous WP and the new WP). If the flushed LBAs are in the write command, the flow of operations moves to operation 870. If the flushed LBAs are not in the write command, the flow of operations moves to operation 850. There may also be LBAs that are not flushed (e.g., LBAs after the new WP). For each LBA that is not being flushed, the flow of operations moves to operation 870.

At operation 850, the processing device determines if the LBA is in the secondary cache. For example, the zone manager 113 compares each LBA between the previous WP and the new WP to LBAs currently in the secondary cache as represented by the ZLT. If the LBA is in the secondary cache/ZLT (e.g., an LBA is being written to the ZRWA for a second/subsequent time), the flow of operations moves to operation 860. If the LBA has not been previously written in the secondary cache (e.g., LBAs are being flushed that have not been previously written), the flow of operations moves to operation 855. Operation 850 is similar to operation 820 described above.

Due to the random nature of write requests in the ZRWA and the way in which the new WP is calculated (e.g., at operation 840), it is possible to flush LBAs that have not been written. There may not be entries of the ZLT (and therefore data is not stored in the secondary cache) for LBAs between the previous WP and the new WP. For example, the new WP, corresponding to an LBA location, may be calculated to be higher than the entries including LBAs stored in the ZLT. For instance, in FIG. 6, the new WP=LBA24, but the highest LBA stored in the ZLT (based on the highest LBA stored in the secondary cache) is LBA9. Accordingly, the zone manager 113 does not remove entries spanning LBA20:23 because such entries are not stored in the ZLT. Instead, as described herein, the zone manager 113 will indicate LBA20:23 are unmapped (e.g., at operation 855).

At operation 855, the processing device indicates that a particular LBA has not been mapped to a PBA. As described herein, the zone manager 113 performs logical to physical mapping by mapping, for instance LBAs written to the secondary cache to PBAs of the ZRWA. When LBAs are written directly from the write buffer to the primary cache, the ZRWA is bypassed such that the zone manager 113 does not map logical blocks to physical blocks of the ZRWA. In one embodiment, the zone manager 113 sets an unmapped data bit in the LBA metadata to indicate that the particular LBA has not been mapped and/or the LBA is unwritten or deallocated.

At operation 860, the processing device writes data referenced by LBAs of the secondary cache between the previous WP and the new WP to the primary cache using the ZLT. For example, the zone manager 113 reads the LBA and PBA mapping information stored in an entry of the ZLT. The zone manager 113 then obtains data referenced by the mapping information and writes the data to the primary cache. As described herein, writing data referenced by the LBAs from the secondary cache to the primary cache flushes the LBAs from the secondary cache to the primary cache.

At operation 865, the processing device invalidates the flushed LBAs in the secondary cache and the ZLT, if any. For example, with respect to the secondary cache, the zone manager 113 invalidates or otherwise deletes data from the secondary cache that was referenced by the flushed LBAs. With respect to the ZLT, the zone manager 113 removes entries of the ZLT including LBAs between the previous WP and the new WP, if any.

At operation 870, the processing device determines, for each LBA of the write command, whether each LBA is between the previous WP and the new WP. As described with reference to FIG. 6, the new WP may result in writing data referenced by one or more LBAs of the write command directly to the primary cache. For example, the zone manager 113 may write data referenced by LBAs directly from a write buffer to the primary cache, as described in operation 875 below. If an LBA of the write command is between the previous WP and the new WP (i.e., referring to the example in FIG. 6, LBA20 of the write command is between previous WP=LBA4 and new WP=LBA24), then the flow of operations moves to operation 875. If an LBA of the write command is not between the previous WP and the new WP, then the flow of operations moves to operation 880. In other words, a write command can include both an LBA that is not between the previous WP and the new WP, which leads to performing operation 880, and an LBA that is between the previous WP and new WP, which leads to also performing 875.

At operation 875, the processing device writes each LBA of the write command between previous WP and new WP to the primary cache. As described herein, the zone manager 113 writes LBAs from a write buffer to the primary cache.

At operation 880, the processing device writes the data referenced by LBAs of the write command to the secondary cache and adds an entry mapping to the ZLT. Operation 880 is similar to operations 830 and 835 described above.

At operation 885, the processing device updates the ZRWA LBA range using the new WP. For example, the zone manager 113 begins the ZRWA LBA range at the new WP. The updated ZRWA becomes the range of LBAs starting from the new WP to the number of LBAs defined by the ZRWASZ. For instance, if WP=4 and LRWASZ=16 LBAs, the ZRWA spans LBA4:19.

In some embodiments, at operation 885, the processing device also updates the IZFR LBA range using the new WP. For example, the zone manager 113 begins the IZFR LBA range at the end of the ZRWA. The IZFR becomes the span of LBAs starting from the last LBA of the ZRWA to the number of LBAs defined by the ZRWASZ. For instance, if the last LBA of the ZRWA range is LBA19 and LRWASZ=16, the IZFR LBA range spans LBA20:35.

In some embodiments, the zone manager 113 does not update the ZRWA range and/or IZFR range. Instead, for each received write operation (e.g., at operation 805), the zone manager 113 determines the ZRWA range and/or IZFR range using the WP (e.g., determined at operation 840 above) and the ZRWASZ. The zone manager 113 uses the determined ZRWA range at operation 815 above.

Figure 9:
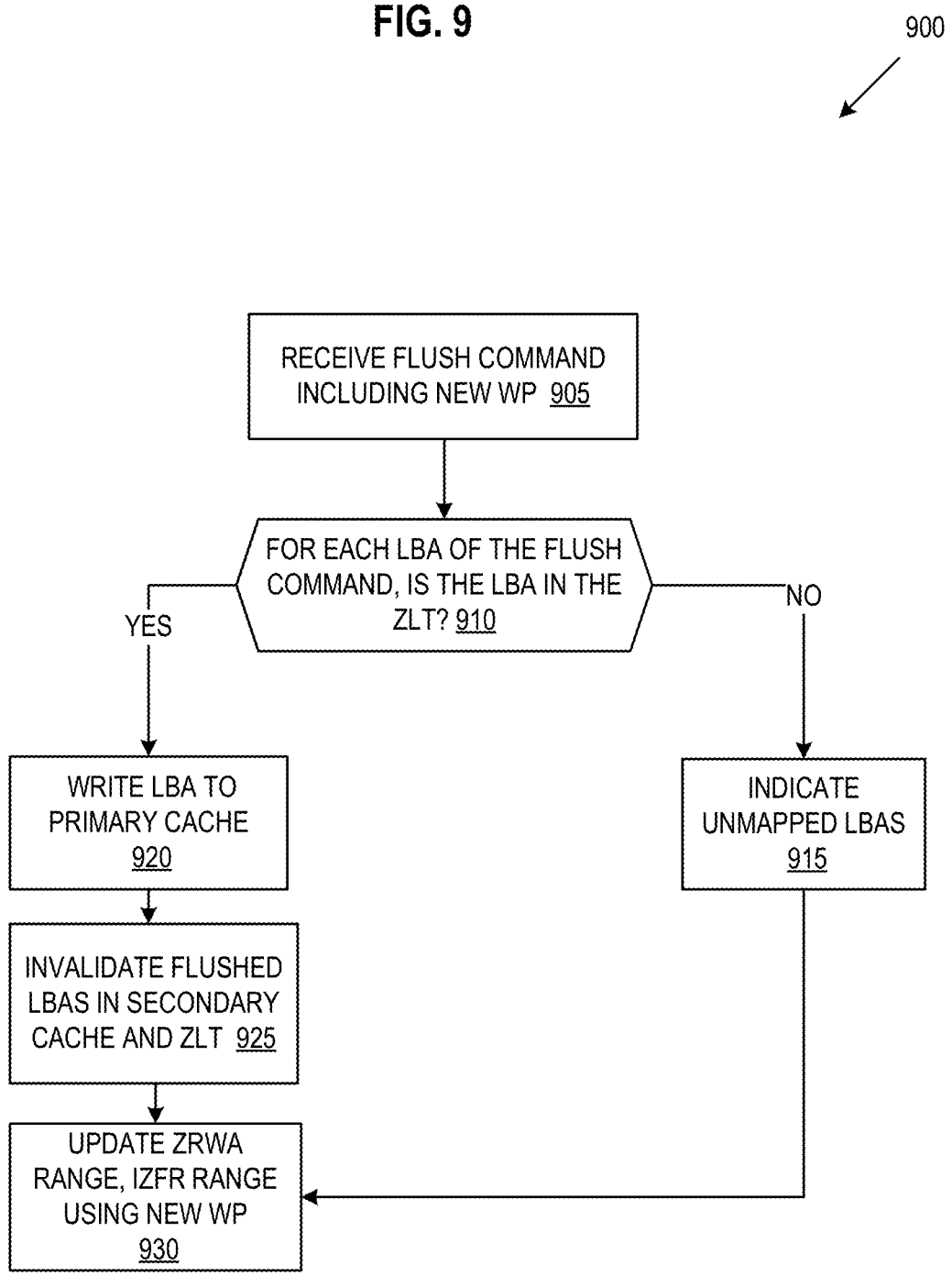
FIG. 9 is a flow diagram of an example method to implement an explicit flush in accordance with some embodiments of the present disclosure.

FIG. 9 is a flow diagram of an example method to implement an explicit flush, in accordance with some embodiments of the present disclosure. As described herein, an explicit flush transfers data from the secondary cache to the primary cache. For ease of description, the secondary cache described in the method 900 is storing data referenced by LBAs and the ZLT has mapped such LBAs to PBAs.

The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the zone manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 905, the processing device receives a flush command. In some embodiments, the flush command indicates a new WP location. In other embodiments, the flush command indicates LBAs to be flushed from the secondary cache to the primary cache. The last LBA flushed becomes the LBA before the new WP location. For example, if LBA0:3 are flushed, LBA3 is the LBA before the new WP location and new WP=LBA4.

At operation 910, the processing device determines whether each LBA of the flush command has been previously written and is, therefore, mapped in an entry of the ZLT. Similar to operations 845 and 850 described in FIG. 8, the zone manager 113 compares each LBA between the previous WP and the new WP to LBAs stored in entries of the ZLT. Because of the random nature of the write commands, there may be scenarios in which LBAs were never mapped using entries of the ZLT. If the zone manager 113 determines that an LBA of the flush command is not stored in the ZLT, the flow of operations moves to operation 915. If the zone manager 113 determines that an LBA of the flush command is stored in the ZLT, the flow of operations moves to operation 920. In other words, the explicit flush command can flush both an LBA that was previously stored in the ZLT, which leads to performing operation 920, and an LBA that was not previously stored in the ZLT, which leads to also performing 915.

Operation 915 is similar to operation 855 described in FIG. 8. If an LBA is not stored in an entry of the ZLT, the zone manager 113 will indicate the unmapped LBA when writing the LBA to the primary cache.

At operation 920, the processing device writes the flushed LBAs and the corresponding data to the primary cache. Similar to operation 860 described in FIG. 8, the zone manager 113 uses the ZLT to map LBAs to PBAs of the secondary cache and reads data at the PBAs, writing the data to the primary cache.

At operation 925, the processing device invalidates flushed LBAs in the secondary cache and the ZLT. Similar to operation 865 described in FIG. 8, the zone manager 113 deletes data referenced by the LBAs in the secondary cache that has been transferred to the primary cache. The zone manager 113 also removes entries of the ZLT including LBAs that have been flushed to the primary cache.

At operation 930, the processing device updates the ZRWA range and IZFR range using the new WP of the flush command. Similar to operation 885 of FIG. 8, the zone manager 113 uses the new WP and the ZRWASZ to determine the ZRWA range and the IZFR range. In some embodiments, the zone manager 113 does not update the ZRWA range and/or IZFR range.

Figure 10:
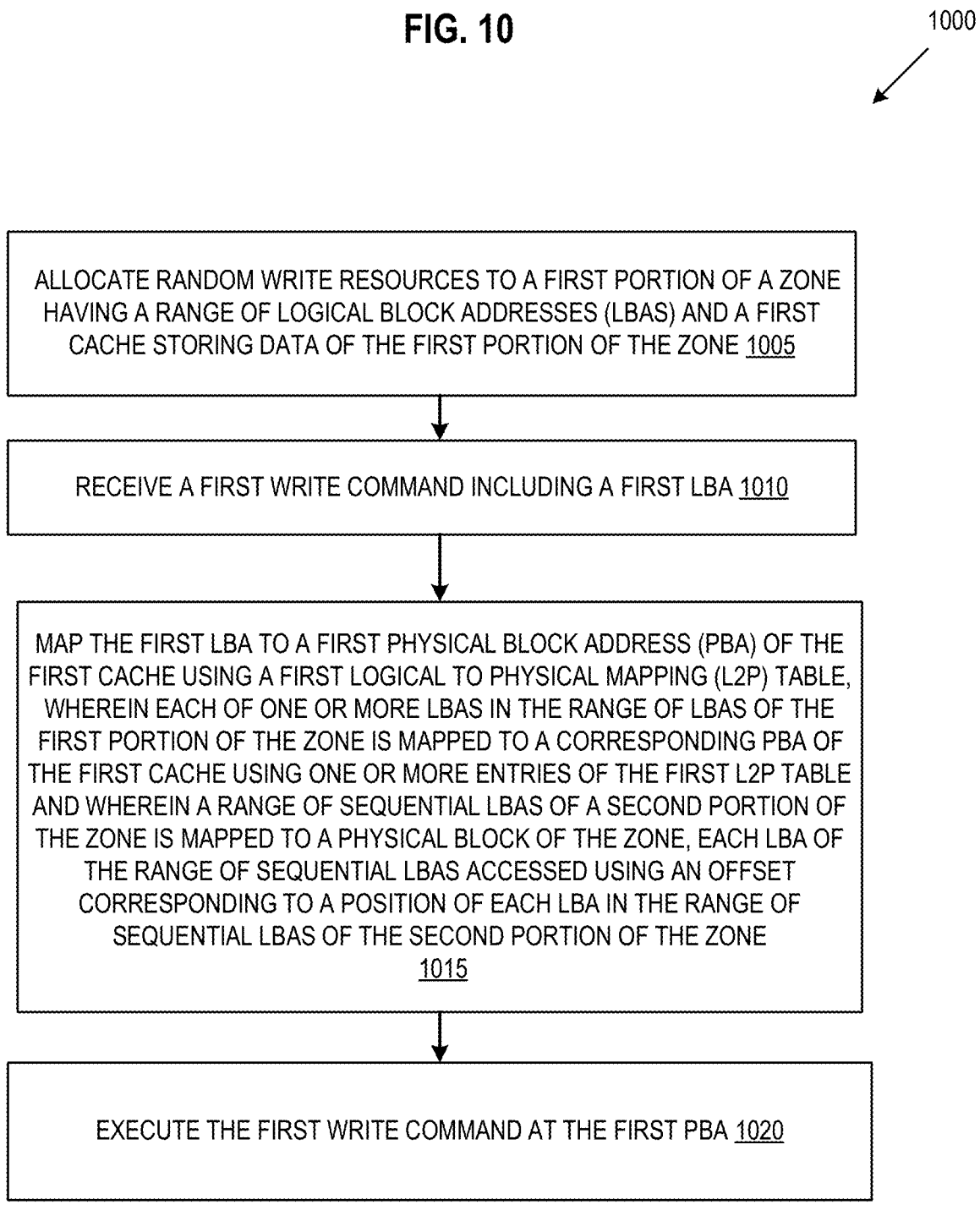
FIG. 10 is a flow diagram of an example method to implement ZRWA on ZNS memory devices in accordance with some embodiments of the present disclosure.

FIG. 10 is a flow diagram of an example method 1000 to implement ZRWA on ZNS memory devices, in accordance with some embodiments of the present disclosure. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the zone manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1005, the processing device allocates random writes resources to a first portion of a zone having a range of LBAs and a first cache storing data of the first portion of the zone. As described herein, some zones include ZRWA spanning a range of LBAs. In some embodiments, the zone manager 113 creates a ZRWA of a zone by allocating ZRWA resources to a portion of zone. As described herein, when the zone manager 113 allocates the ZRWA, the zone manager 113 also allocates a cache storing data received in ZRWA write commands.

At operation 1010, the processing device receives a first write command including a first LBA. As described with reference to operation 805 of FIG. 8, the zone manager 113 receives a write command including data to be written to one or more LBAs. The write command may have a write command LBA range with a starting LBA and an ending LBA. In some embodiments, the starting and ending LBA are the same.

At operation 1015, the processing device maps the first LBA to a first physical block address (PBA) of the first cache using a first logical to physical mapping (L2P) table. Each of one or more LBAs in the range of LBAs of the first portion of the zone is mapped to a corresponding PBA of the first cache using one or more entries of the first L2P table. A range of sequential LBAs of a second portion of the zone is mapped to a physical block of the zone. Each LBA of the range of sequential LBAs accessed using an offset corresponding to a position of each LBA in the range of sequential LBAs of the second portion of the zone. As described herein with reference to FIG. 3, a L2P table for the ZRWA (e.g., ZLT) stores the LBAs that are included in the range of LBAs of a current ZRWA. The ZLT maps LBAs included in ZRWA write commands to PBAs of the ZRWA. As described herein, each entry of the ZLT maps a LBA to a PBA of the ZRWA. In contrast, each entry of a different L2P table (e.g., a L2P table mapping LBAs to PBAs of a second portion of the zone), maps a range of LBAs to a range of PBAs. For example, other LBAs that are not included in the ZRWA are managed using zone-level mapping (e.g., not in ZLT but instead using a less granular L2P mapping than the LBA mapping in ZLT).

At operation 1020, the processing device executes the first write command at the first PBA. With reference to operation 835 of FIG. 8, the zone manager 113 writes data referenced by the LBA to the cache of the ZRWA. Specifically, the zone manager 113 writes data to a PBA of the ZRWA.

Figure 11:
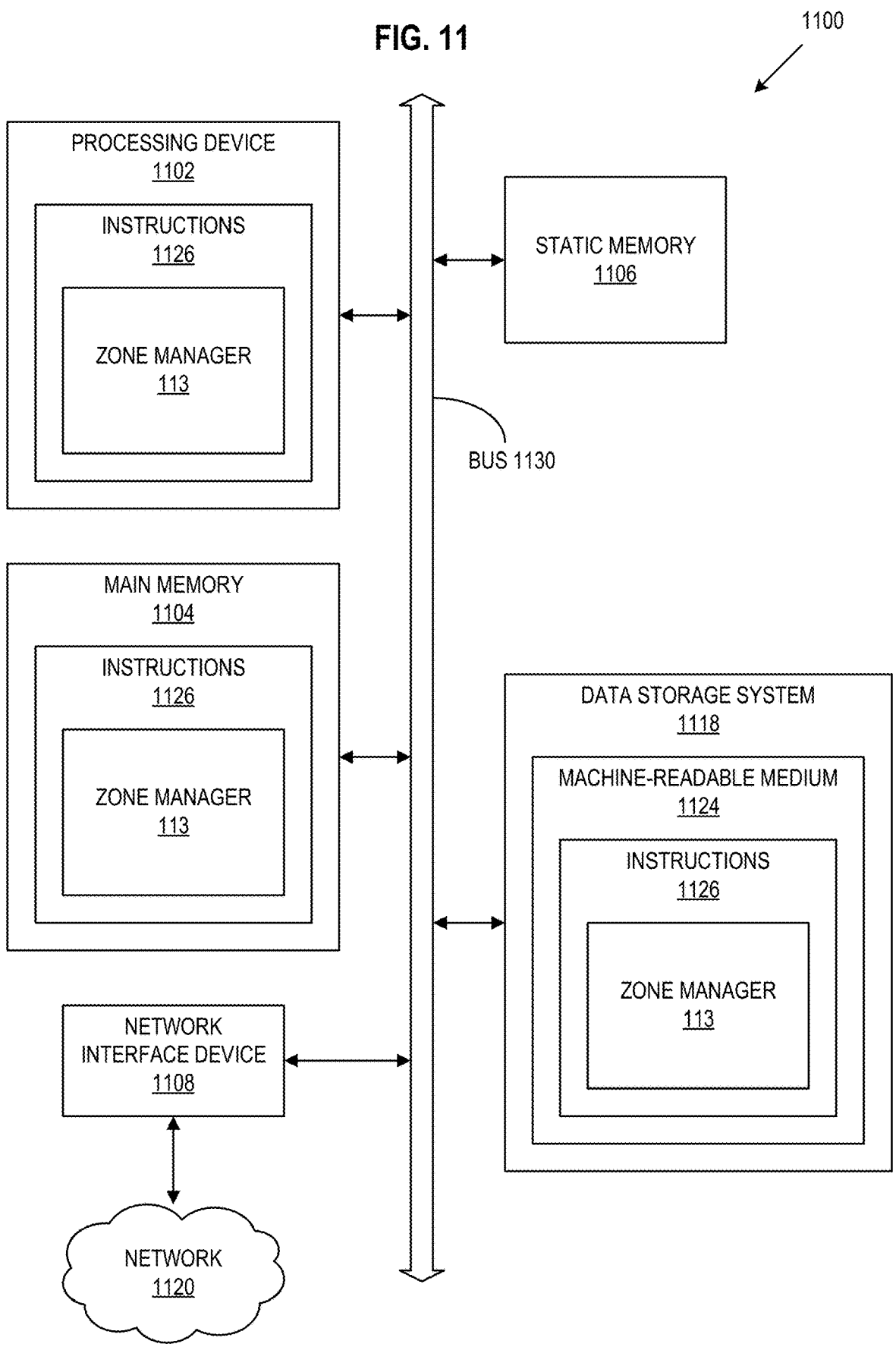
FIG. 11 is a block diagram of an example computer system in which embodiments of the present disclosure may operate.

FIG. 11 illustrates an example machine of a computer system 1100 within which a set of instructions, for causing the machine to perform any one or more of the methodologies discussed herein, can be executed. In some embodiments, the computer system 1100 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the zone manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein. The computer system 1100 can further include a network interface device 1108 to communicate over the network 1120.

The data storage system 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage system 1118, and/or main memory 1104 can correspond to the memory subsystem 110 of FIG. 1.

In one embodiment, the instructions 1126 include instructions to implement functionality corresponding to a zone manager (e.g., the zone manager 113 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 800, 900, and 1000 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
allocating random write resources to a first portion of a zone having a range of logical block addresses (LBAs) and a first cache storing data of the first portion of the zone;
receiving a first write command including a first LBA;
mapping the first LBA to a first physical block address (PBA) of the first cache using a first logical to physical mapping (L2P) table, wherein each of one or more LBAs in the range of LBAs of the first portion of the zone is mapped to a corresponding PBA of the first cache using one or more entries of the first L2P table and wherein a range of sequential LBAs of a second portion of the zone is mapped to a physical block of the zone, each LBA of the range of sequential LBAs accessed using an offset corresponding to a position of each LBA in the range of sequential LBAs of the second portion of the zone; and
executing the first write command at the first PBA.

2. The method of claim 1, wherein the first LBA is included in the range of LBAs of the first portion of the zone.

3. The method of claim 1, further comprising:
receiving a second write command including a second LBA;
determining that the second LBA is not included in the range of LBAs of the first portion of the zone; and
flushing one or more LBAs of the first cache to a second cache.

4. The method of claim 3, further comprising:
invalidating one or more LBAs in the first L2P table corresponding to the flushed one or more LBAs of the first cache.

5. The method of claim 3, wherein flushing the one or more LBAs of the first cache to the second cache further comprises:
obtaining a first write pointer (WP) corresponding to a first LBA in the range of LBAs of the first portion of the zone;
calculating a second WP corresponding to a second LBA; and
transferring data, for each LBA between the first WP and the second WP, from the first cache to the second cache.

6. The method of claim 1, further comprising:
receiving a second write command including the first LBA;
determining the first L2P table includes an entry including the first LBA;
updating the first L2P table by mapping a second PBA to the first LBA; and
executing the second write command at the second PBA.

7. The method of claim 1, wherein the first L2P table is a size to store mappings of two times the range of LBAs of the first portion.

8. A non-transitory computer-readable storage medium comprising instructions that, when executed by a processing device, cause the processing device to:
allocate random write resources to a first portion of a zone having a range of logical block addresses (LBAs) and a first cache storing data of the first portion of the zone;
receive a first write command including a first LBA;
map the first LBA to a first physical block address (PBA) of the first cache using a first logical to physical mapping (L2P) table, wherein each of one or more LBAs in the range of LBAs of the first portion of the zone is mapped to a corresponding PBA of the first cache using one or more entries of the first L2P table and wherein a range of sequential LBAs of a second portion of the zone is mapped to a physical block of the zone, each LBA of the range of sequential LBAs accessed using an offset corresponding to a position of each LBA in the range of sequential LBAs of the second portion of the zone; and
execute the first write command at the first PBA.

9. The non-transitory computer-readable storage medium of claim 8, wherein the first LBA is included in the range of LBAs of the first portion of the zone.

10. The non-transitory computer-readable storage medium of claim 8, wherein the processing device is further to:
receive a second write command including a second LBA;
determine that the second LBA is not included in the range of LBAs of the first portion of the zone; and
flush one or more LBAs of the first cache to a second cache.

11. The non-transitory computer-readable storage medium of claim 10, wherein the processing device is further to:
invalidate one or more LBAs in the first L2P table corresponding to the flushed one or more LBAs of the first cache.

12. The non-transitory computer-readable storage medium of claim 10, wherein flushing the one or more LBAs of the first cache to the second cache further causes the processing device to:
obtain a first write pointer (WP) corresponding to a first LBA in the range of LBAs of the first portion of the zone;
calculate a second WP corresponding to a second LBA; and
transfer data, for each LBA between the first WP and the second WP, from the first cache to the second cache.

13. The non-transitory computer-readable storage medium of claim 8, wherein the processing device is further to:
receive a second write command including the first LBA;
determine the first L2P table includes an entry including the first LBA;
update the first L2P table by mapping a second PBA to the first LBA; and
execute the second write command at the second PBA.

14. The non-transitory computer-readable storage medium of claim 8, wherein the first L2P table is a size to store mappings of two times the range of LBAs of the first portion.

15. A system comprising:
a plurality of memory devices; and
a processing device, operatively coupled with the plurality of memory devices, to:
allocate random write resources to a first portion of a zone having a range of logical block addresses (LBAs) and a first cache storing data of the first portion of the zone;
receive a first write command including a first LBA, wherein the first LBA is included in the range of LBAs of the first portion of the zone;
map the first LBA to a first physical block address (PBA) of the first cache using a first logical to physical mapping (L2P) table, wherein each of one or more LBAs in the range of LBAs of the first portion of the zone is mapped to a corresponding PBA of the first cache using one or more entries of the first L2P table and wherein a range of sequential LBAs of a second portion of the zone is mapped to a physical block of the zone, each LBA of the range of sequential LBAs accessed using an offset corresponding to a position of each LBA in the range of sequential LBAs of the second portion of the zone; and execute the first write command at the first PBA.

16. The system of claim 15, wherein the processing device is further to:

receive a second write command including a second LBA;

determine that the second LBA is not included in the range of LBAs of the first portion of the zone; and flush one or more LBAs of the first cache to a second cache.

17. The system of claim 16, wherein the processing device is further to:

invalidate one or more LBAs in the first L2P table corresponding to the flushed one or more LBAs of the first cache.

18. The system of claim 16, wherein flushing the one or more LBAs of the first cache to the second cache is further to:

obtain a first write pointer (WP) corresponding to a first LBA in the range of LBAs of the first portion of the zone;

calculate a second WP corresponding to a second LBA; and transfer data, for each LBA between the first WP and the second WP, from the first cache to the second cache.

19. The system of claim 15, wherein the processing device is further to:

receive a second write command including the first LBA;

determine the first L2P table includes an entry including the first LBA;

update the first L2P table by mapping a second PBA to the first LBA; and execute the second write command at the second PBA.

20. The system of claim 15, wherein the first L2P table is a size to store mappings of two times the range of LBAs of the first portion.

* * * * *